Patented Dec. 9, 1952

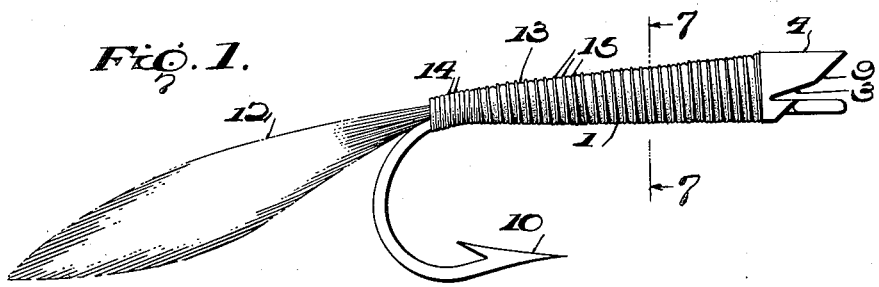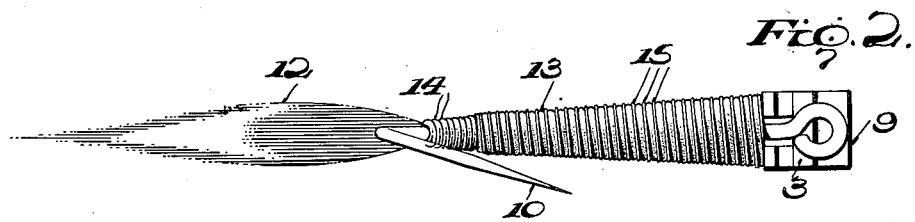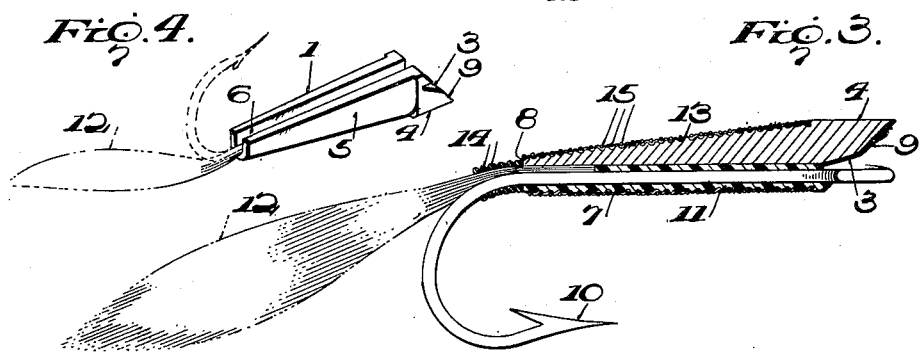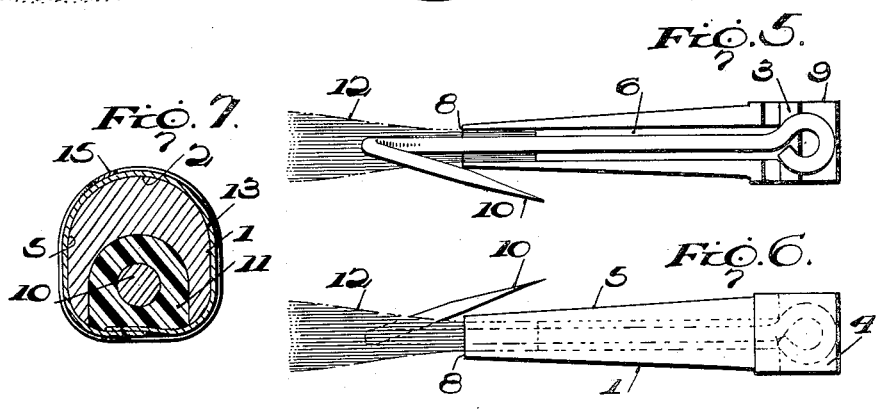
INVENTOR
George Lee Green

2,620,587

UNITED STATES PATENT OFFICE 2,620,587

FISH LURE

George Lee Green, Washington, D. C.

Application June 21, 1951, Serial No. 232,805

1 Claim. (Cl. 43—42.28)

My invention relates to fish lures, and more particularly to a fish lure especially designed to simulate the movements of a live minnow or of similar small fish.

The object of this invention is to provide an inexpensive, but durable, fish lure which will appear animated when drawn through the water, thus attracting and engaging all kinds of fish attempting to catch the lure.

In the accompanying drawing which forms a part of this specification:

Figure 1 is a side elevation of the complete lure,

Figure 2 is a bottom plan view of the complete lure,

Figure 3 is a horizontal sectional view of the lure,

Figure 4 is a perspective view of the lure casing,

Figure 5 is a bottom plan view, partially assembled, of the lure,

Figure 6 is a top plan view of the assembly shown in Figure 5, and

Figure 7 is a sectional view, on line 7—7 of Figure 1 with the tail and the exposed portion of the hook omitted.

In the accompanying drawing which forms a part of this specification:

Numeral 1 relates to the flat side of the casing, which casing is made of balsa wood, or other light woods or materials, and which casing is the basic part around which the completed lure is constructed. The opposite side 5 is also flat. The top 9 of the casing, from which the eye of the hook protrudes, is slanted at a 45 degree angle. The top 9 of the casing is notched as illustrated by numeral 3. This slanted, notched top serves to simulate the mouth of a small fish. The shank of the hook to be used is set longitudinally within the casing, the barbed end protruding from the lower, tapered end 8 of the casing. The flat front side 7 of the casing is slanted in such a manner as to be parallel with the axis of the shank of the hook.

The barbed end 10 of the hook is offset at a 20 degree angle from the longitudinal line of the shank of the hook. This offset serves to snare the barbed end 10 of the hook in the mouth of the fish with more certainty, regardless of the approach which the fish may make to engage the hook. The hook is secured within the casing by means of a cementitious metallic substance, such as liquid solder, or other suitable material, in order to prevent any movement of the hook within the casing.

Numeral 2 designates the rounded back of the casing. However, the upper portion 4 of this side of the casing is not rounded, but is made flat in order to aid in the effective simulation of the head of a small fish. The groove or hollowed-out portion 6 of the casing, in which the shank of the hook has been placed, also serves to receive one end of a tail 12 which is composed of hair, preferably goat hair. The metallic substance 11 serves not only to secure the hook within the casing, but also to secure the end of tail 12 in the casing. After the hook, tail 12, and metallic substance 11, have been properly placed within the casing, the casing is then shellacked.

After the casing has been shellacked, tin foil 13 or a similar material is then wrapped around the outside of the casing from the lower, tapered end 8 to a point near the top 9 of the casing. A thread, preferably silk, is then wound around hook and tail 12 from a point below the tapered end 8 of the casing to, and slightly above, tapered end 8 of the casing. This thread 14 is not necessary to secure the tail 12, inasmuch as that has been accomplished by the use of the metallic substance 11, but by wrapping the tail 12 to the hook in this manner the tail 12 is held in a curved position following the contour of a curved portion of the hook. This curvature of the tail 12 serves to simulate the moving tail of a small fish. The outside wrapping 15 of the fish lure is then attached. This wrapping 15 is a nylon leader binding, covering that portion of the casing which has previously been covered by the tin foil 13. The outer wrapping 15 is spaced so as to allow the tin foil 13 to show through. The gleam of the tin foil 13 serves to give the completed lure a shiny appearance similar to that of the body of a live minnow or other small fish.

From the foregoing description, it is thought that the construction and operation of the device will be readily understood by those skilled in the art, and further description thereof is deemed unnecessary. It will be understood, however, that the lure may be made in different sizes and shapes, and painted with various colors in order to increase its effectiveness and to provide it with an attractive appearance.

Having thus described the invention, what is claimed as new is:

A fish lure comprising a U-shaped casing tapered from front to rear and having aligned V-sectioned notches extending transversely of the front end thereof, said casing having a surface of shellac, a hook within the casing having its eye in contact with the sides of the casing at the front end thereof below the notch, a hackle secured to the hook within the casing and extending out of the rear end thereof, a cementitious material within the casing securing the hook and hackle to the casing and completely filling the casing; a sheet of tinfoil completely surrounding the casing from the rear end thereof to a point closely adjacent to the front end thereof, a wrapping of leader material surrounding the tinfoil throughout the length thereof, the shellacked exterior surface of the casing between the wrappings and the front end thereof being freely exposed, and a thread of silk surrounding the hook and hackle at the rear end of the casing, the hook having its bill and barb extending from the rear end thereof with the barb laterally spaced from the casing.

GEORGE LEE GREEN.

REFERENCES CITED

The following references are of record in the file of this patent:

UNITED STATES PATENTS

| Number | Name | Date |
|---|---|---|
| 1,557,083 | Peckinpaugh | Oct. 13, 1925 |
| 1,900,832 | Martin | Mar. 7, 1933 |
| 2,333,484 | Miles | Nov. 2, 1943 |
| 2,544,265 | Kelly et al. | Mar. 6, 1951 |